Figure 1:
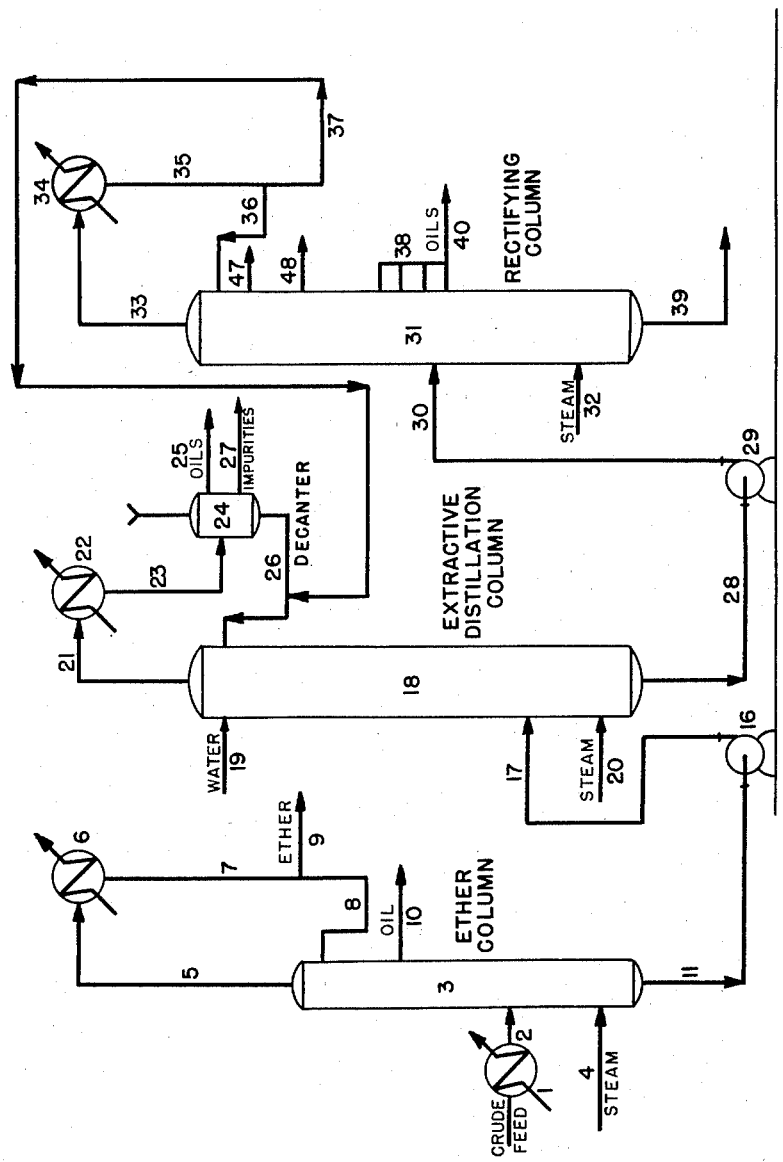

WERNER G. MULLER
FRANKLYN D. MILLER
INVENTOR.

Oct. 27, 1959  W. C. MULLER ET AL  2,910,412
ALCOHOL PURIFICATION PROCESS

Filed Oct. 17, 1955  2 Sheets-Sheet 2

WERNER C. MULLER
FRANKLYN D. MILLER
INVENTOR.

BY Mitchell J. Condos

United States Patent Office 2,910,412
Patented Oct. 27, 1959

2,910,412

ALCOHOL PURIFICATION PROCESS

Werner C. Muller, Roslyn, N.Y., and Franklyn D. Miller, Cincinnati, Ohio, assignors to National Petro-Chemicals Corporation, New York, N.Y., a corporation of Delaware Application October 17, 1955, Serial No. 540,839

4 Claims. (Cl. 202—39.5)

This invention relates generally to a novel process for refining and purification of crude aliphatic alcohols produced by the hydration of mono-olefins. More specifically, the invention relates to a process whereby an impure alcohol produced by hydration of mono-olefins is processed to remove, in a simplified integrated operation, impurities boiling below the boiling point of the alcohol being purified, impurities boiling in substantially the same range as the alcohol and impurities boiling above the boiling point of alcohol. Moreover, the invention provides an effective process in which both water-soluble impurities, including objectionable odor-producing and potential odor-producing contaminants, are removed from aliphatic alcohols prepared by the hydration of olefins. Still more specifically, the invention provides an improved process for purification of an impure ethanol-containing stream produced by hydration of ethylene in which the ethanol-containing stream, after appropriate initial refining steps, is subjected to a novel rectification treatment whereby ethanol free of objectionable odor attributable to impurities higher boiling than the ethanol is produced. Furthermore, and still more specifically, the invention provides an improved process for the refining and purification of crude ethanol obtained by catalyzed hydration of ethylene in which the total crude ethanol stream is subjected to an initial treatment for removal of volatile materials (e.g., diethyl ether) and to a water extractive distillation, following which the resulting dilute aqueous alcohol containing a small amount of high boiling polymer oils is subjected to rectification, under defined controlled conditions, whereby residual thermally unstable impurities that undergo decomposition and degradation to produce malodorous products, including degradation products higher boiling than ethanol, are removed producing a product alcohol of high proof and free of objectionable odor normally imparted thereto by the presence of such degradation products that are higher boiling than the product alcohol. More specific details and features of the invention will be apparent from the description set forth hereinafter.

By the catalyzed hydration of olefins is meant those processes in which mono-olefins are hydrated in the presence of a catalyst, including both the acid catalyzed processes wherein mono-olefins and mixtures thereof are hydrated in the presence of polybasic mineral acid-acting acids such as sulfuric acid, phosphoric acid, and benzenesulfonic acid, and those processes of the direct hydration type in which the olefin is hydrated in the presence of solid catalysts such as phosphoric acid, phosphoric acid-tungsten oxide and the like. One of the common commercial processes comprises absorption of ethylene in strong sulfuric acid to yield an absorbate, containing monoethyl sulfate and diethyl sulfate esters, which is diluted and hydrolyzed followed by separation therefrom of a crude aqueous ethanol mixture. By practice of this invention, excellent yields of high quality purified alcohol can be produced in simplified manner from such crude ethanol mixtures for use in industries requiring solvents free of objectionable odor and which industries include those for manufacture of cosmetics, perfumes, drugs, and the like.

It is well known that alcohols produced by the aforesaid methods, and especially those produced by the sulfuric acid hydration of olefins, possess to a more or less degree a distinct and foreign odor that is penetrating and disagreeable. Although it is not intended to ascribe the disagreeable odor of these alcohols to the presence of any one or to any particular combination of chemical compounds, it is known that the odors of the crude alcohols depend largely on the quality of the starting material, that is, the purity of the olefin stream employed in the olefin hydration operation. Likewise, the odor of the product alcohol depends to a similar extent on the quality of the crude alcohol from which it is originally prepared. Thus, a rather wide range of variations in purity and odor characteristics is possible for synthetic ethanol products from such hydration processes.

Olefin hydrocarbons such as those produced by the cracking of mineral oils, fuel oils, kerosenes, petroleum residues, hydrocarbon gases, and the like, contain variable amounts of compounds having an obnoxious odor, particularly compounds containing chemically bound sulfur such as hydrogen sulfide, alkyl sulfides, mercaptans, etc. These materials, even when present as traces in the olefinic stream fed to the acid hydration process, contribute heavily to the objectionable obnoxious odor of the crude alcohol produced therefrom. Although pure elemental sulfur itself has no objectionable odor, it produces powerful odoriferous agents when it is present in combination with other elements. The undesirable odor of such alcohols has also been at least partially attributed to the presence of so-called polymer products of wide boiling ranges which are formed by side reactions during the acid catalyzed olefinic hydration process. The odor of these polymerized products is further accentuated by the presence of any sulfur compounds contained therein, although the odor of some pure polymers is, by itself, somewhat unpleasant. Moreover, the obnoxious odors in some hydration alcohols can be directly attributed to the decomposition of some of these polymeric materials during subsequent distillation operations. It is also possible that the presence of traces of nitrogen compounds contributes to the odor of the crude alcohols.

In order to illustrate the number and diversity of the impurities usually present in alcohols produced by catalyzed hydration processes, the following analysis is set forth which is based on a sample of crude ethanol produced by sulfuric acid hydration of ethylene, the proportions set forth in the analysis being on the basis of anhydrous alcohol:

| | Weight percent |
|---|---|
| Ethanol | 88.0. |
| Ether | 11.25. |
| Ketones | Trace. |
| Hydrocarbons | 0.45. |
| Higher alcohols | Trace. |
| Sulfur compounds | 3 p.p.m. as sulfur. |
| Polymer materials | 0.30. |

As to the polymer materials fraction, resulting from the production of ethanol by sulfuric acid hydration of ethylene, a typical A.S.T.M. distillation thereof is as follows:

| | Temp., ° F. |
|---|---|
| Initial boiling point | 211 |
| 5% | 412 |
| 10% | 419 |
| 20% | 428 |
| 30% | 435 |
| 40% | 441 |

|  | Temp., °F. |
| --- | --- |
| 50% | 450 |
| 60% | 459 |
| 70% | 469 |
| 80% | 490 |
| 90% | 512 |
| 95% | 545 |
| End point | 558 |

Recovery, 96%.

Thus, regardless of exact causes, crude ethanol produced by the sulfuric acid hydration of ethylene contains impurities which are peculiar to products of such a process and which products include water, ethers, ketones, higher alcohols, hydrocarbons, sulfur and nitrogen compounds, and polymer oils having more or less complex chemical structures.

In endeavors to purify crude aqueous ethanol resulting from acid hydration of ethylene, resort has been made to use of a method comprising the following operational steps. The crude aqueous alcohol has been diluted with additional water in an attempt to throw out of solution a portion of the water-insoluble impurities, followed by separation of any layer of insoluble impurities that is formed. The remaining aqueous alcohol has then been subjected to distillation in a conventional rectification column wherein some of the low boiling impurities, including the major portion of the ethers and light hydrocarbons, were removed overhead. The aqueous bottoms fraction from this rectification have then been passed to a second rectification column from which a cut containing heavy polymer oils and water was removed at a point somewhat below the feed plate in the rectifier; another cut containing lighter polymer oils, ethanol and water was removed at a point or points slightly above the feed plate; and an overhead cut containing volatile impurities and volatile polymer decomposition products was removed from the top of the tower while the product alcohol itself was recovered as a side stream removed at a point a few plates from the top of the tower. By use of such a process in which the rectification is carried out in conventional manner, the product alcohol has been unsatisfactory as the process consistently produces final ethanol fractions which, though of desired high proof, possess objectionable odor characteristics of more or less intensity depending on the composition and properties of the starting alcohol fraction.

It has also been suggested that crude aqueous alcohol mixtures containing impurities, as aforedescribed, can be subjected to an improved operation in which the crude aqueous ethanol fraction is fed to a water extractive distillation tower at an intermediate point therein and into which controlled amounts of water are fed to the top of the tower or at a point near the tower top in sufficient quantity to reduce the concentration of ethanol in the internal liquid reflux to from 2 to 60 weight percent. At such dilutions, the volatility of the water-insoluble impurities including ethers, ketones, higher alcohols, low molecular weight hydrocarbons and the higher boiling polymer oils is enhanced somewhat thereby facilitating their removal. However, even by such an operation, the resulting aqueous alcohol has been found to contain higher boiling polymeric materials which, though present in relatively small amounts, are nevertheless sufficient to provide malodor to product alcohols produced therefrom by conventional rectification for concentration of the aqueous alcohol from the water extractive distillation operation. As discussed more fully hereinafter, the malodor of the product alcohol is attributed at least in part to decomposition and degradation products of the higher boiling polymer oils that still remain in the aqueous alcohol from the water extractive distillation step, said degradation products being in part less volatile than the product alcohol but more volatile than the polymer oils introduced into the rectifier.

With further reference to the process for production of crude ethanol products by hydration of ethylene using sulfuric acid, diethyl ether is normally produced as a by-product in amounts from about 3 to about 15 weight percent based on the amount of ethanol produced. It has been found advantageous, although not always necessary, to remove substantially all of the ether before the alcohol fraction is subjected to further purification treatments. In addition thereto, impurities such as those aforedescribed are present, particularly malodorous polymer oils having relatively high boiling ranges, e.g., up to 660° F. Such higher boiling materials are difficult, if not impossible, to remove completely by water extractive distillation even in the presence of large amounts of water and even by use of the most favorable operating conditions. Hence, in subsequent distillation operations, the dilute aqueous alcohol product obtained from such conventional purification and refining operations, but containing a small residual amount of odoriferous or potentially odoriferous impurities as aforedescribed, is ordinarily passed to a rectifying column wherein the alcohol is concentrated and recovered as an overhead fraction of desired proof. It has been further found, however, that when introduced into the rectifying column even in small amounts, the relatively high boiling impurities, including particularly the polymer oils, undergo thermal degradation and decomposition yielding lower boiling polymer oils, sulfur-containing materials, partially oxygenated organic compounds, and the like. These lighter fractions have lower molecular weight and boiling ranges than the polymer oils introduced in the feed to the rectifier since the lighter fractions generally consist of fragments of the heavier polymer oils. Some of the degradation and decomposition products that are produced are higher boiling than the product alcohol (e.g., about 190 proof recovered from the rectifier while others boil lower than the product alcohol. Because of these characteristics, and in conventional rectification operations for provision of high proof alcohols, malodorous decomposition and degradation products that boil higher than the product alcohol, but are volatile from alcohol of slightly lower proof than the product alcohol, are normally carried over into the product alcohol in amounts which, though small, impart objectionable odor characteristics to the product alcohol.

In order to illustrate the behavior (under conditions normally existing in rectification) of the relatively small amount of high boiling polymeric oils normally present in alcohol mixtures produced by subjecting a crude alcohol product from sulfuric acid hydration of ethylene to treatment for removal of volatile materials (e.g., ethers) and to a water extractive distillation treatment as aforedescribed, such a partially refined aqueous alcohol product of 25 proof was subjected to rectification under conditions to concentrate the alcohol to a proof of 192.

During the rectification, a sample of an oily fraction that accumulated in the vicinity of the feed plate in the rectifying column was withdrawn.

A portion of the withdrawn oily sample which was found to contain 350 p.p.m. of sulfur, was added to refined aqueous ethanol and refluxed in a laboratory distillation column (180 to 200° F., atmospheric pressure). A sample of alcohol withdrawn from the overhead in this distillation shortly after refluxing was begun showed only a slight malodorous characteristic. A sample overhead withdrawn after 24 hours of refluxing was extremely malodorous and exhibited a sulfurous characteristic. The residual oil recovered from the charge was analyzed and showed only 225 p.p.m. of sulfur. Thus, it is clear that substantial portions of the sulfur-containing oils decomposed during the period of refluxing and that the decomposed volatile material carried relatively large amounts of sulfur and malodorous impurities into the overhead fraction.

Another sample of the polymer oil withdrawn from the vicinity of the feed plate in the rectifier was distilled to dryness under vacuum (0.4 mm.) and yielded the following fractions at temperatures from 175 to 225° F.:

| Fraction No. | Weight, gm. | Sulfur, p.p.m. |
| --- | --- | --- |
| Cold trap | 2.6 | 722 |
| No. 1 | 6 | 210 |
| No. 2 | 12.8 | 154 |
| No. 3 | 14.3 | 144 |
| No. 4 | 4.2 | 526 |
| Residue | 1.6 | |

Thus, the volatile decomposition product collected in the Dry Ice cold trap located on the condenser vent contained the greatest concentration of sulfur. Although appreciable concentrations of sulfur were found in all fractions, the greatest amount (i.e., 722 p.p.m.) of sulfur found in the cold trap represents volatile impurities produced by the thermal decomposition of the heavy sulfur-containing polymer oils during the distillation. Such thermal decomposition causes the high sulfur content of the cold trap fraction, all of which is volatile and passes overhead with ethanol during distillation.

In order to illustrate in more specific manner the preparation of alcohol mixtures for practice of the invention, crude aqueous alcohol mixtures containing from about 0.1 to about 2% of polymer oils and produced by the hydration of an ethylene-containing stream with sulfuric acid may be employed as the starting mixture. In addition to the polymer oils, such crude aqueous alcohol mixtures may contain from about 3 to about 15% by weight of diethyl ether depending on whether or not the crude ethanol has previously been treated for removal of volatile components, including particularly diethyl ether. Moreover, the crude alcohol mixture also contains varying amounts of water as, for instance from about 12 to about 60% by weight.

Preferably the crude aqueous alcohol mixture is initially subjected to a fractional distillation in which the alcohol mixture is introduced at an intermediate point into a distillation tower that may have from 30 to 60 plates and operated at a superatmospheric pressure, such as 5 to 20 p.s.i.g., to facilitate condensation of ether. The temperature within the column is controlled such that the temperature at the top of the column is between 120 to 140° F. and at the bottom between 120 to 220° F. whereby the vapor stream from the upper portion of the column generally has the approximate composition of 98 weight percent ether, 1.5 weight percent water, and traces of acetaldehyde and other low boiling impurities. The overhead fraction is condensed and at least a portion is removed as crude diethyl ether for further purification. Some polymer oil impurities which are move volatile than aqueous ethanol may concentrate in the ether removal column at a point in the vicinity of the feed plate and such impurities are preferably removed from the column as a separate stream which constitutes a relatively small portion of the total odor producing material in the crude ethanol.

The crude aqueous alcohol stream containing the remaining impurities, but preferably substantially free of ether, is removed as a bottoms fraction from the aforesaid distillation column. If ether has been removed, the bottoms stream may, in illustration, contain about 60% alcohol, 39.5% water, and 0.5% impurities, including malodorous and potential malodorous materials. If the stream has not previously been subjected to distillation to remove ether, it may contain up to about 15% diethyl ether in addition to the aforedescribed components. Such an aqueous ethanol stream which contains thermally unstable polymeric oils which have been found to decompose to volatile malodorous materials during later rectification operations, is withdrawn and subjected to a water extractive distillation treatment by feeding the mixture to an intermediate point of a water extractive distillation tower. Sufficient water is added at the top portion of the tower at a point above the feed plate to reduce the concentration of ethanol in the internal reflux to 5 to 40 weight percent and preferably 10 to 30 weight percent. The water present in the extractive distillation treatment raises the active boiling temperature on the trays in the tower and causes upward passage of volatile organic impurities remaining in the alcohol. However, certain of the remaining polymeric oils, including some of the sulfur-bearing types, are not sufficiently volatile to be forced upward and out of the column as overhead. These higher boiling impurities include substances of the type which have been found to be subject to degradation and decomposition during subsequent rectification steps when the alcohol is concentrated and separated from the major portion of water. These higher boiling, malodorous and potentially malodorous impurities generally have boiling ranges above 400° F., but under thermal conditions of fractionation, decompose into more volatile portions, which in the presence of aqueous ethanol, boil at or below the temperature range of ethanol. There is consequently produced as a bottoms stream from the extractive distillation operation an aqueous ethanol stream containing from about 3 to about 20 weight percent of ethanol and up to about 0.2 weight percent of the high boiling thermally decomposable malodorous impurities. For example, by the aforedescribed treatment of crude aqueous alcohol mixtures obtained from the olefin hydration processes, aqueous bottoms streams of the following composition are obtained from the water extractive distillation treatment and which bottoms streams are typical of, and suitable for use as, aqueous alcohol mixtures contemplated for concentration and purification as embodied herein to provide high proof alcohol devoid of objectionable odor characteristics.

*Extractive distillation column bottoms*

| | |
| --- | --- |
| Ethanol | 3.0–15.0 weight percent. |
| Polymer oils | 0.002–0.20 weight percent. |
| Sulfur compounds | 1.0–5.0 p.p.m. as sulfur. |
| Water | Remainder. |

In the use of an aqueous bottoms stream from the extractive distillation column as a feed material for conventional rectification to concentrate the ethanol to a relatively high proof (e.g., 190 to 192 proof), the high boiling polymer oils in the feed to the rectifier accumulate at or in the vicinity of the feed plate and, in conventional operation, a side stream is withdrawn at or in the vicinity of the feed plate to remove such accumulating polymer oils. However, and as will be obvious to those skilled in the art, it is not possible to remove the polymer oils introduced with the feed to the rectifier until a relatively high concentration has been accumulated in the feed zone. At the temperature normally required for carrying out the desired concentration of the aqueous alcohol fraction, a portion of the polymer oils accumulated in the feed zone of the rectifier undergo decomposition and/or degradation into products more volatile than the polymeric oils in the feed. For example, in the use of a rectification column having 65 plates operated at a column top temperature of 175° F., and a bottoms temperature of 220° F. and at a reflux ratio of 3.5:1 whereby an aqueous alcohol feed of about 25 proof is concentrated to 192 proof, and in which operation the aqueous alcohol mixture is fed to an intermediate portion (plate 24 in the column), the product alcohol recovered as an overhead product has been found to contain malodorous impurities, including impurities higher boiling than the alcohol even though, during rectification, a side stream (containing about 5% of the alcohol fed) is withdrawn at the vicinity of the feed plate in the rectifier for removal of undecomposed polymeric oils introduced into the rectifier and which accumulate in the vicinity of the feed zone. Similarly, in such a rectification wherein product alcohol of about 192 proof is withdrawn as a side stream from a plate or plates in the top portion of the column, such product alcohols have also been found to contain such malodorous impurities. Moreover, in operation of such rectifications under pressure whereby higher temperatures are required, correspondingly large amounts of malodorous impurities are normally present in the product alcohol. In view of the presence, in product alcohols from such conventional rectifications, of malodorous impurities inclusive of materials that are higher boiling than the product alcohol mixture, difficulty has been encountered in obtaining therefrom alcohols free of objectionable odor. By the present invention, as is described more fully hereinafter, aqueous alcohol mixtures containing a small but objectionable amount of higher boiling polymeric oils and which mixtures have been derived from an olefin hydration process, are subjected to a novel rectification treatment whereby there is obtained, directly from the rectifier, a product alcohol of high proof devoid of malodorous impurities less volatile than the alcohol product or devoid of such impurities in amounts sufficient to impart to the alcohol product objectionable odor characteristics attributable to such impurities. Thus, more specifically, it has been found that an aqueous alcohol mixture of relatively low proof (e.g., 25), prepared from hydration of ethylene using sulfuric acid to prepare a crude aqueous alcohol mixture, and which crude aqueous alcohol mixture has been treated for substantial removal of impurities but contains a small amount (e.g. up to about 0.5 percent) of high boiling polymer oils, can be subjected to a controlled rectification treatment whereby to produce directly from the rectifier an alcohol of high proof (e.g., 190 and above) devoid of objectionable odor characteristics attributable to degradation products higher boiling then the alcohol product but lower boiling than the polymer oils from which they originate.

In accordance with this invention, an aqueous alcohol mixture as aforedescribed containing higher boiling polymeric oils and derived from olefin hydration processes, is subjected to rectification under conditions to concentrate the mixture to an alcohol of relatively high proof, as for example a proof of 190 or more and, during the rectification, withdrawing a side stream at or in the vicinity of the feed zone to the rectifier and, also, another side stream at a zone in the rectifier substantially above the feed zone but below the point of withdrawal of product alcohol from the rectifier. By carrying out the rectification in such a manner, and more particularly under controlled conditions as described more fully hereinafter, it has been found that degradation products more volatile than the polymer oils fed to the rectifier but less volatile than the alcohol product, and which tend to be carried over therewith in conventional rectifications, may be removed directly from the rectifier to an extent that the product alcohol is devoid of objectionable odor attributable to such degradation products. More specifically, and in the rectification of aqueous alcohol mixtures as aforedescribed for concentration thereof to a proof of 190 or more, the rectification is carried out by withdrawing a side stream at or in the vicinity of the feed zone in an amount containing about 1% to about 10% of the alcohol fed to the rectifier while also withdrawing a side stream at a portion of the rectifier whereat the alcohol mixture under rectification is at a proof of from about 170 to about 190, more preferably, from about 175 to about 188 and, more specifically, at a proof of about 185. As to the latter side stream, the amount withdrawn may be varied to meet particular requirements, but, in general, the amount withdrawn is a small proportion of alcohol fed to the rectifier and, in general, need only be in amounts of from about 1% to about 10% based on the alcohol fed to the rectifier. It has been found that in such an operation, the side stream withdrawn from the rectifier at a point substantially above the feed zone and preferably in the zone wherein the mixture under rectification is at the aforedefined proofs, degradation malodorous impurities that boil higher than the product alcohol but are lower boiling than the polymer oils fed to the rectifier, may be so substantially removed as a concentrate thereof in the side stream that the product alcohol from the rectifier is devoid of such malodorus impurities or devoid thereof in amounts that would impart objectionable odor characteristics attributable to such impurities and which impurities, in the absence of the additional side stream withdrawal as aforedescribed, are normally carried over in the product alcohol.

In carrying out the improved process embodied herein, it is desirable and in most cases necessary to carry out the process by use of more fractionation, in the portions of the rectifier wherein the alcohol proof is at a relatively high proof (e.g., about 180 or more), than is normally required for effecting the desired concentration of the alcohol feed so as to provide a concentration gradient of the degradation products between the point of the product alcohol withdrawal and the point of withdrawal of the side stream withdrawn below the product alcohol but substantially above the feed zone. For example, as compared to a conventional rectification operation under comparable conditions, including reflux ratios, for concentration of an aqueous alcohol fraction as aforedescribed of about 20 to 30 proof to a proof of about 192, the rectification as embodied herein wherein a side cut is withdrawn whereat the alcohol proof is 170 to 190, is carried out by use of more fractionation than is normally required, such as by use of additional plates, in the portion of the rectifier whereat the alcohol proof is above about 180, and preferably above about 188. It has been found that by carrying out rectification in the aforesaid manner, the side cut taken substantially above the feed tray, such as whereat the alcohol proof is from about 170 to 190, an alcohol of substantially high proof (e.g., 192) may be withdrawn as overhead or as a side cut from the top portion of the column devoid of malodorous impurities higher boiling than the alcohol fraction or devoid of such impurities in amounts that impart objectionable odor to the product alcohol. For example, experiments carried out with malodorous impurities isolated from product alcohols derived from conventional rectification treatments reveal that malodorous characteristics are imparted to the product alcohol when the malodorous contaminants that are higher boiling than the product alcohol are present in amounts greater than about 1 p.p.m. In treatment of alcohol mixtures as aforedefined by the process of this invention, product alcohols are obtained directly from the rectifier devoid of impurities higher boiling than the alcohol product or devoid of such impurities to the extent that the product alcohols contain less than about 1 p.p.m. and even less than 0.5 p.p.m. of malodorous materials, and hence, are devoid of objectionable odor characteristics attributable to such malodorous degradation products of the polymer oils introduced in the feed to the rectifier.

In order to illustrate practice of the invention, but without intent of limitation, a description thereof is set forth hereinafter with reference to the accompanying drawings representing schematic flow diagrams and apparatus assemblages suitable for carrying out the process of this invention.

Referring to Figure 1, a crude ethanol feed of the approximate following composition is preheated to about 300° F. in preheater 1.

7.5% ether
0.5 polymer oils
58% alcohol
34% water

The preheated feed is fed continuously to ether removal column 3, a rectifying column of approximately 40 trays operating at approximately 15 p.s.i.g. pressure, to facilitate condensation of the ether. The feed plate is preferably located at or slightly below the midpoint of the column. Heat is supplied to the base of column 3 by live steam line 4, or, alternatively, by a closed steam coil (not shown), and fractional distillation of the crude ethanol feed is thereby effected. The temperature at the bottom of column 3 is maintained at about 200–220° F. and, at the top of column 3, at about 125–130° F. Vapor boiling overhead from column 3 is removed through overhead line 5, and passed to total condenser 6. The condensate from condenser 6, predominantly diethyl ether with some low boiling polymer oils, aldehydes and water are removed via line 7. A major part of this stream is returned via line 8 to provide refluxing liquid for column 3 and the remainder is withdrawn by line 9 as crude diethyl ether product which may be further purified and refined as desired.

A part of the polymer oils and oxygenated impurities present in the crude ethanol feed, particularly those which are more volatile than ethanol in the presence of aqueous ethanol solution of feed compositions accumulate in column 3 as a non-aqueous phase at a point near and slightly above the feed point. These impurities are withdrawn from column 3 via line 10. They may be added to the bottoms stream from column 3 or they may be further processed separately. Dilute ethanol stripped of its more volatile impurities, particularly the predominant impurity diethyl ether as well as a small amount of polymer oils and other impurities, is withdrawn from the base of column 3 through line 11 and passed to pump 16 which discharges through line 17 to extractive distillation column 18. This column is preferably a distillation tower of about 45 plates and feed line 17 is positioned at or slightly above the midpoint. Dilution water is introduced into column 18 via line 19 at a point above the feed point, either at or near the top of the column. Continuous extractive distillation is thus conducted in column 18. The water is introduced in amounts sufficient to effect dilution and to modify and increase the volatilities of the organic compounds, particularly the remaining polymer oil impurities such that they can be substantially removed from the alcohol by distillation. The water employed may be pure water or it can be an aqueous stream which is recycled from the bottom of the alcohol rectification column described hereinafter.

The feed to column 18 is preferably preheated, prior to introduction into the column, to a temperature at or near that of the internal liquid reflux under equilibrium conditions of the tray located at the introduction position. The column is operated with continuous introduction of alcohol feed, continuous introduction of water above the feed, and with sufficient heat provided to effect distillation throughout the column. The amount of water added is sufficient to reduce the ethanol concentration to 5 to 40 weight percent, and preferably 10 to 30 weight percent, in the internal liquid reflux. Operating thus, the purified aqueous ethanol fraction recovered as the bottoms stream is dissolved in and carried downward in the aqueous internal reflux. Steam is introduced into the base of column 18 through line 20, or, alternatively, heat may be supplied to column 18 by means of a closed heating coil. Overhead vapors boiling from column 18 are carried by line 21 to condenser 22 whereby the lighter oil impurities together with the aqueous ethanol vapors which distill from column 18 are removed in the overhead stream via line 21 and passed to condenser 22. The resulting condensate in condenser 22 is then passed to decanter 24. By using sufficient dilution water in column 18, the oil impurities distilled from column 18 form an upper oil phase in decanter 24 and are withdrawn through line 25 for further treatment. The lower aqueous phase from decanter 24 is returned to column 18 as reflux through line 26, or, alternatively, may be partially or totally withdrawn through line 27 as an overhead aqueous stream to remove any water soluble impurities present.

Bottoms product stream from column 18 containing the predominant part of the original ethanol in dilute aqueous solution of about 3 to about 20 weight percent of ethanol and essentially free of all of its original impurities with the exception of a small amount of the heavy hydrocarbon oils is withdrawn via line 28. From line 28 it is passed to pump 29 discharging through line 30 to rectifying column 31. Heat is supplied to the base of column 31 by sparging steam through line 32, or alternatively, it can be supplied through a closed heating coil (not shown). In column 31, operated at a bottoms temperature of 220° F. a top temperature of 176, and a reflux ratio of 3.5:1, the purified aqueous alcohol is concentrated to the desired strength, i.e., about 192 proof. Heavy polymer oils which accumulate near the feed tray of column 31 are substantially withdrawn from above and below the feed plate through side connections 38 and pipe 40 for further processing as for example, by recycle to extractive distillation column 18. Water substantially free of alcohol is withdrawn from the base of column 31 through line 39 and this aqueous bottoms stream may, if desired, be partially or totally recycled to extractive distillation column 18 and added via line 19.

In accordance with this invention and in addition to the heavy oils withdrawn in conventional manner from, or in the vicinity of, the feed plate such as by line 38 and 40, another side cut is taken at a point in the column substantially above the feed plate and the aforesaid conventional heavy oils draw but below the point or points of product alcohol withdrawal from the rectifier. In an embodiment as shown in Figure 1, and with use of a 77 plate tower for tower 31 for concentrating the alcohol feed to 190 proof, a side cut is taken via line 48 disposed in the rectifier in the portion thereof whereat the alcohol proof is from about 170 to about 190. As shown, side cut line 48 is disposed below product alcohol line 47 and substantially above the feed plate and the side cut withdrawals 38 and 40 at or in the vicinity of the feed plate. The stream withdrawn via line 48 may be passed to the extractive distillation column 18 for recovery of the alcohol content thereof; and the stream withdrawn from line 40 may be separated into an oil phase and an aqueous alcohol phase and the resulting aqueous phase recycled to rectifying column 31, or alternatively, stream 40 may be passed to an oil concentrating column for recovery of alcohol and concentration and removal of oil. Moreover, in such an embodiment, vapors boiling overhead from column 31 which consist of partially refined ethanol containing impurities more volatile than alcohol are passed via line 33 to condenser 44. The condensed ethanol fraction is withdrawn from condenser 34 through line 35. A part is returned to the top of column 31 from line 36 to provide reflux and a partially refined alcohol fraction is withdrawn through line 37 and preferably is recycled into the upper portion of extractive distillation in column 18. By operating in the aforedescribed manner, it has been found that the product alcohol of about 192 proof withdrawn via line 47 is devoid of, or so substantially devoid of, malodorous components higher boiling than the product alcohol that it is completely free of objectionable odor attributable to such impurities but which may contain volatile substances.

Figure 2:
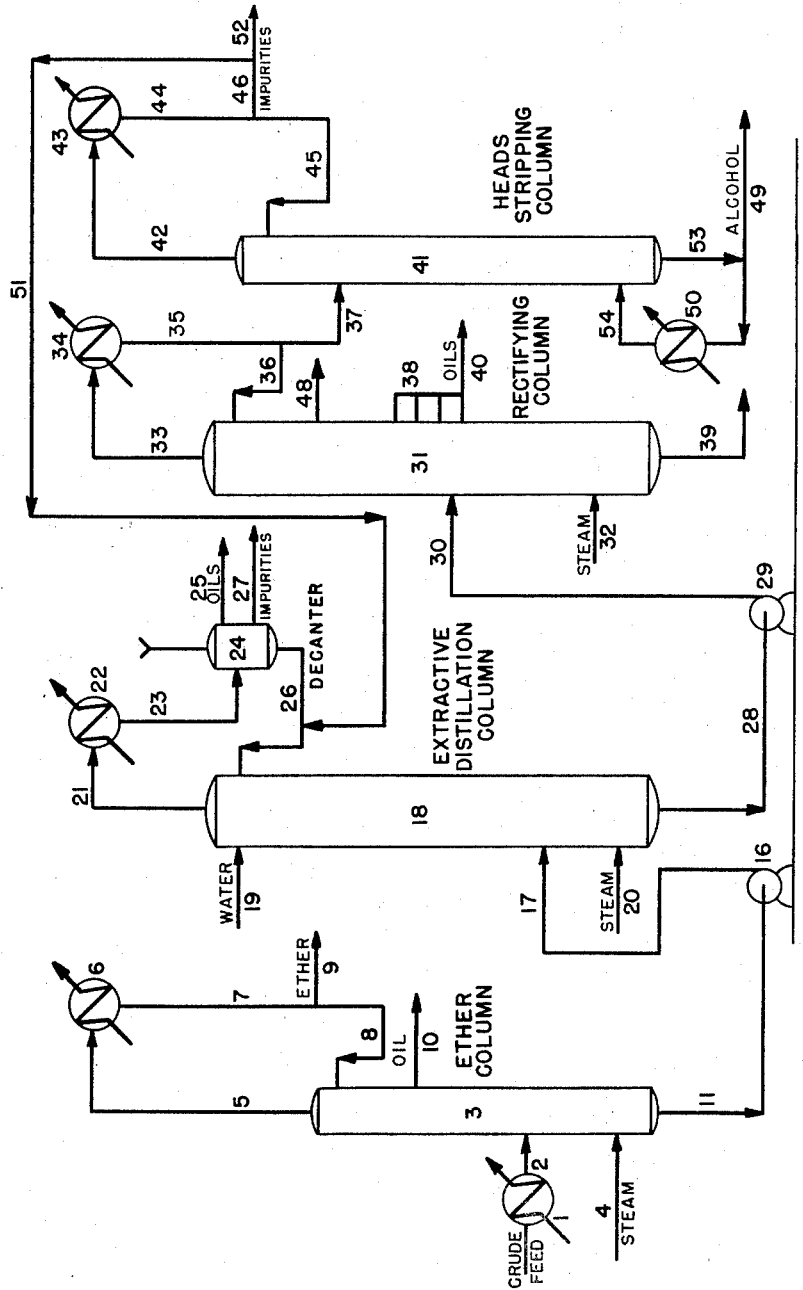

In a more preferred embodiment, the invention is carried out in a process as illustrated in Figure 2. In Figure 2, the process set forth is similar to that illustrated in Figure 1 except that, with respect to column 31, product alcohol is not taken off as a side stream in the top portion of the column but is withdrawn completely as an overhead product via line 33. In the embodiment of Figure 2, and similar to that described in Figure 1, heavy oils accumulating at or near the vicinity of the feed plate are withdrawn via line 40 and, also, a side cut is withdrawn via line 48 disposed in the column substantially above the withdrawal line for heavy oils accumulating near the feed plate and, preferably, line 48 is disposed in a zone in the column whereat the alcohol proof is at 170 to 190. Through line 48, the side cut is withdrawn in amounts that generally contain from about 1% to about 10% of the alcohol fed to column 31. Product alcohol withdrawn via line 33 containing volatile impurities, but devoid of degradation malodorous impurities higher boiling than the product alcohol, is passed via line 33 to condenser 34 and the condensed ethanol fraction is withdrawn from condenser 34 through line 35. A part is returned to the top of column 31 through line 36 to provide reflux, and the partially refined alcohol fraction withdrawn through line 37, is passed to heads stripping column 41 of 20 to 40 plates to remove the degradation impurities which are lower boiling than the product alcohol. In operation of the heads stripping column, heat is supplied to the base of column 41 by means of a closed steam coil 50, which discharges vapors through line 48 into column 41. The volatile decomposition products which enter column 41 with the alcohol feed pass upward through the column and are removed overhead via line 42, condensed in condenser 43, and withdrawn from condenser 43 via line 44. A part of the condensate is returned as reflux to column 41 via line 46 and a part (about 0.5 to 5.0 weight percent of the ethanol feed stream) is withdrawn via line 45. If desired, the alcohol in this stream may be removed via line 52 and recovered by any suitable means. Alternatively, this volatile impurities stream can be recycled in whole or in part via line 51 to the top section of extractive distillation column 18 for recovery of the alcohol contained therein and removal of impurities through purge line 27. Highly refined ethanol, free of both lower and higher boiling malodorous impurities, is passed from the bottom of column 41 to line 53. A part is recycled through closed steam coil 50 and line 54 to provide heat for column 41, and the remainder is withdrawn via line 49 as highly refined product alcohol. In operation of the heads stripping column, about 100 to 1000 B.t.u.'s of heat are supplied to the base of the column for each pound of alcohol withdrawn as product from the base of said column. Such heat requirements are generally necessary to provide sufficient vapor upflow to distill the malodorous volatile impurities upward against the downwardly flowing stream of product alcohol.

In more specific illustration of the invention, an embodiment is described hereinafter with reference to a process as set forth in Figure 2 and in which aqueous ethanol mixture of about 25 proof, prepared by initial treatment as aforedescribed in ether column 3 and water extractive column 18, was passed into plate 24 of rectifying column 31 having 77 plates, operated at a bottoms temperature of 220° F., a top temperature of 176° F. and at a reflux ratio of 3.5:1. Heavy oils accumulating in the feed zone were withdrawn by side stream draws taken from plates 19, 25 and 31 in amounts such that the side cut withdrawn via line 40 amounted to 5% of the alcohol fed to column 31. During the rectification, a side stream was withdrawn via line 48 positioned at plate 47 whereat the alcohol was at a proof of 185, the amount withdrawn via line 48 being 5% of the alcohol fed to column 31. In such an operation the alcohol proof at plate 50 of column 31 was about 190 thereby providing in the 77 plate column an amount of fractionation substantially more than was required to effect the concentration of the feed to a proof of 190, whereby there was provided a concentration gradient between the point of withdrawal of product alcohol and the point of withdrawal of the degradation product, higher boiling than the product alcohol, via line 48. From such an operation the side stream wthdrawn via line 48 was a highly malodorous aqueous alcohol mixture, which, upon analysis, was found to contain malodorous impurities higher boiling than the product alcohol. On the other hand, the overhead alcohol product (192 proof) removed via line 37 was found to be devoid of malodorous impurities higher boiling than the product alcohol and the alcohol product withdrawn via line 37, upon treatment in heads column 41 to remove impurities more volatile than the alcohol product, was a highly refined alcohol of exceptional quality and free of malodor.

For comparison purposes an operation such as aforedescribed was carried out under similar operating conditions with the main exception that rectifier 31 was a 65 plate column and a side draw was not taken via line 48. The product alcohol (192 proof) that was recovered as overhead from line 33 and withdrawn via line 37 was malodorous even when the product in line 37 was subjected to treatment in heads stripping column 41 and volatile impurities removed.

In the practice of this invention, the product alcohols obtained from the described treatment, such as by the embodiment described wtih reference to Figure 2, are of such exceptional purity with respect to being devoid of malodorous substances that they are vastly superior in that respect to current commercially available ethanol derived from olefin hydration processes. Moreover, the alcohol products obtained by the process described herein are also, of high quality otherwise as evidenced by the following data obtained from analysis thereof as compared to alcohol products obtained in similar manner but without withdrawal of a side cut as at line 48 in Figure 2.

|  | Without side draw | With side draw |
| --- | --- | --- |
| Specific gravity at 60° F | 0.8118 | 0.8118. |
| Acidity as acetic | 0.0012 | 0.0009. |
| Chlorides | None | None. |
| Clarity on dilution | Clear | Clear. |
| Color, APHA | <5 | <5. |
| Proof | 192 | 192. |
| Odor | Slight hydrocarbon odor. | No detectable foreign odor. |
| KMnO₄ time | >60 minutes | >60 minutes. |
| Solubility | Good | Good. |
| Carbonizables | Trace | None. |
| Appearance | Good | Good. |

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. In a method for purifying and refining crude aqueous ethanol produced by the hydration of an ethylene containing stream, said crude ethanol containing both lower and higher boiling impurities, including diethyl ether and polymeric oils that thermally degrade to malodorous substances including such substances that are lower boiling than said polymeric oils but higher boiling than said aqueous ethanol of substantially increased ethanol concentration, which comprises the steps of (a) feeding said crude aqueous ethanol into a fractional distillation zone, removing from the upper portion of said zone a stream containing lower boiling impurities including substantially all of the diethyl ether and other impurities boiling below ethanol, removing from the lower portion of said zone an aqueous ethanol stream, (b) passing said aqueous ethanol stream into a fractional extractive distillation zone, feeding water into said fractional extractive distillation zone at a point above the aqueous ethanol feed stream, maintaining an internal liquid reflux having an ethanol content of 5 to 40 weight percent within the zone below the water feed point, removing from the upper portion of said extractive distillation zone a stream containing organic impurities including both lower and higher boiling materials, removing from the lower portion of said extractive distillation zone, a dilute aqueous ethanol stream containing residual polymeric oils, and (c) passing said dilute aqueous ethanol stream into the intermediate portion of a vertically elongated rectification zone maintained at conditions to concentrate the aqueous ethanol to a product ethanol of substantially higher ethanol concentration, withdrawing from the rectification zone a first stream containing residual oils accumulating in the vicinity of the feed zone; the improvement which comprises withdrawing from the rectification zone, at a point whereat the aqueous ethanol undergoing concentration is at a proof from about 170 to 190, a second stream containing malodorous residual oil degradation substances lower boiling than the residual oils fed to the rectification zone but higher boiling than the product ethanol, withdrawing from the rectification zone, at a point above the point of withdrawal of said second stream, a product ethanol substantially devoid of said malodorous degradation products, and wherein the rectification of the aqueous ethanol containing the residual oils is carried out with use of more fractionation, in a portion of the rectification zone in between the point of withdrawal of the product ethanol and said second stream withdrawal, than is normally required for rectifying the aqueous ethanol feed to the desired ethanol content of the product ethanol.

2. A process as defined in claim 1, wherein the additional fractionation is employed in a portion of the rectification zone whereat the aqueous ethanol undergoing concentration is at a proof of more than about 180.

3. A process as defined in claim 1, wherein the said second side stream is withdrawn in an amount of from about one to about ten percent based on the ethanol fed to the rectification zone.

4. A process as defined in claim 1, wherein the product ethanol is subjected to fractionation to remove components more volatile than the product ethanol.

References Cited in the file of this patent

UNITED STATES PATENTS

| | | |
|---|---|---|
| 2,148,846 | Von Retze et al. | Feb. 28, 1939 |
| 2,638,440 | Drout et al. | May 12, 1953 |
| 2,801,209 | Muller | July 30, 1957 |
| 2,801,211 | Hulse et al. | July 30, 1957 |